Dec. 5. 1933.  A. ROSNER  1,937,717
CABLE FITTING
Filed March 11, 1929
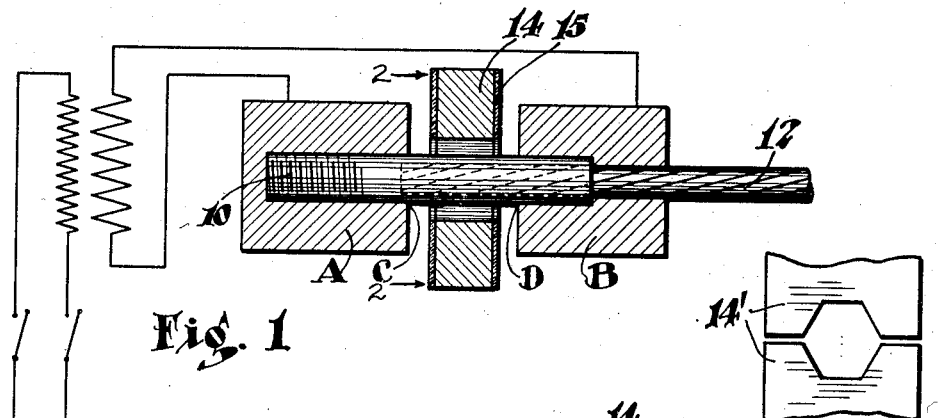
Fig. 1
Fig. 2
Fig. 3
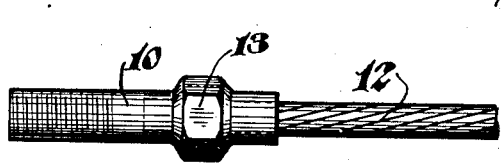
Fig. 4
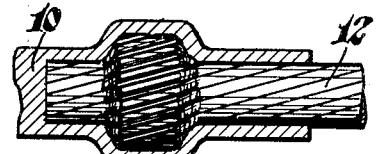
Fig. 5
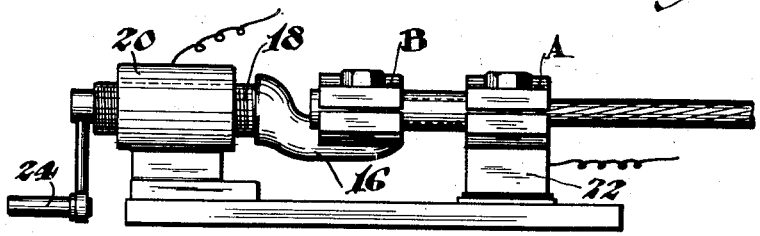
Fig. 6
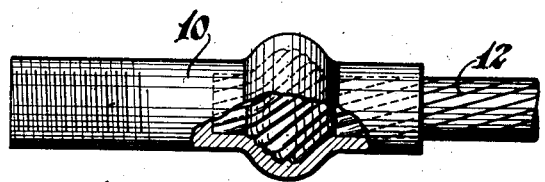
Fig. 7
INVENTOR
Adolph Rosner
BY F. O. Clayton
ATTORNEY Patented Dec. 5, 1933

1,937,717

UNITED STATES PATENT OFFICE 1,937,717

CABLE FITTING

Adolph Rosner, South Bend, Ind., assignor to Bendix Brake Company, South Bend, Ind., a corporation of Illinois Application March 11, 1929. Serial No. 346,064

6 Claims. (Cl. 219—3)

This invention relates to power transmission mechanism and more particularly to a process for coupling a rigid member, such as an end fitting, to a flexible member, such as a steel cable.

An object of the invention relates to securing a fitting such as a clevis, rod end, or eye bolt directly to one end of a flexible steel cable by heating, preferably electrically, telescoped parts of the members and then upsetting said parts and shaping the connection in either one operation or successive operations.

A further important feature of the invention resides in a particular method of upsetting the telescoped members wherein the parts are simultaneously subjected to torsional and compressive stress to twist the bond between the parts.

A further feature of the invention relates to novel apparatus for carrying out the several steps in the aforementioned method, which apparatus may comprise spaced chucks serving as electrodes for heating the work and which are relatively movable.

Further features of my invention, including desirable details of construction and novel combinations of parts will become apparent from the following detailed description of two embodiments of the invention shown in the accompanying drawing, in which:

Figure 1 discloses in longitudinal section a portion of the apparatus employed to carry out one particular process of uniting the transmission elements;

Figure 2 is a sectional view looking in the direction of the arrows of Figure 1 showing the one-piece die for shaping the surface of the bond;

Figure 3 is a fragmentary rim showing a modified form of shaping die;

Figure 4 is a fragmentary enlargement showing the finished product turned out by the apparatus of Figure 1;

Figure 5 indicates an enlarged longitudinal section through the center portion of Figure 4 and shows, in detail, the arrangement assumed by the wires within the upset end of the fitting;

Figure 6 is an elevational view showing a modified form of apparatus for uniting a cable and its fittings; and Figure 7 is a fragmentary enlargement of the finished product of the apparatus of Figure 6 showing in section the bond between the parts.

In that embodiment of my invention disclosed in detail in Figures 1, 4 and 5 there is provided a stationary two-part electrode A and a movable electrode B, which electrodes serve as chucks to clamp respectively a fitting 10, such as a rod end or clevis, and a flexible helically wound multi-strand cable 12. As shown, the cable preferably telscopes within a tubular shaped opening in the end of the rigid member, the major portion of the telescoped parts lying between the electrodes. Electrode B is preferably of larger bore at one of its ends to house the end of the fitting, all as shown in Figure 1. A one-piece die 14, insulated at 15 on its outer faces, may be supported to float or move toward the stationary electrode A and is furthermore preferably provided with a central opening of definite outline, such as hexagonal, concentrically arranged with respect to the fitting.

In carrying out the several steps of this embodiment of my process, the parts to be united are preferably first telescoped and then clamped in position by the electrodes. The electric current is then passed through the work, the relatively high amperage and low voltage developed by the circuit serving to provide an efficient heating unit to soften the parts between the electrodes. The electrodes, which may be water cooled, serve to keep the parts clamped within the same quite cool and also serve to conduct the heat away from the heated central portion, the degree of conduction progressively decreasing from points C and D in Figure 1 up to the center of the work, which is at the highest temperature.

The parts are heated to render the same malleable, care being taken not to burn or volatilize the cable which is preferably of high carbon steel. I find that 1400° Fahrenheit should not be exceeded, although the temperature to which the parts are heated is to be wholly determined by the physical qualities of the materials constituting the fitting and cable. I may use types of brass or bronze fittings in lieu of steel in which event the heating temperature would be controlled accordingly.

When the connection is softened to be easily worked, electrode B is moved toward the stationary electrode A upsetting the telescoped parts into the ball shape of Figure 5, the helically coiled wires of the cable "bird caging" or spreading apart as shown in said figure. As the bond is bulged outwardly it contacts with the hex die 14 which is simultaneously moved with the electrode B thus shaping the outer surface as indicated in the finished product of Figure 4. Care is taken to position the floating die centrally of the space between the electrodes prior to upsetting and the mechanism for simultaneously moving the die and electrode B toward the stationary electrode A is so constructed as to keep the center of the die in line with the center of the bond, thus insuring a symmetrically-shaped enlargement 13 as indicated in Figure 4. In lieu of the one-piece floating die of Figures 1 and 2 the stationary two-piece die 14' of Figure 3 may be used, the parts being first upset and then shaped by the relatively movable die parts.

The size and shape of the bond is determined both by the space between the electrode chucks and by the shape of the die, which of course can be varied at will.

As a modification of my invention I may obviate the so-called "bird caging" or spreading of the wires of the bond by subjecting the heated parts to synchronized twisting or torsional and compressive stresses. As disclosed in Figure 6. the two-part combined electrode and chuck B may be formed on the crooked end 16 of a lead screw 18 journaled in the internally threaded support 20. The stationary two-part electrode A may be supported upon the insulated support 22.

The assembly of the parts and heating are the same as aforementioned, this embodiment differing only in the upsetting operation wherein rotation to the lead screw by handle 24 serves to affect a simultaneous twisting and compression of the heated area to produce the bond clearly indicated in Figure 7. As shown, the wires at the upset portion are kept in engagement one with another thus providing a stronger and more homogeneous structure. The twisting is done without injury or reduction to the cross section of the individual wires.

It is to be clearly understood that this is not a welding process, there being no fusion of the wires at the bond into an integral mass. The wires are merely heated to a workable or malleable state and then upset as described. To fuse the wire would unduly lower the tensile strength entirely removing its temper. With the present invention the tensile strength is to a degree lowered and in order to recondition the union I suggest that the finished product shown in either Figures 4 or 7 be quenched immediately after the upsetting operation and then drawn to say 475° or 500° in a lead or oil bath to revive the temper and restore its tensile strength.

An inexpensive and highly effective union is thus very quickly effected and which withstands separation with loads up to as high as 5,000 pounds for ordinary small sized parts.

While two illustrative embodiments have been described in detail, it is not my intention to limit the scope of the invention to those particular constructions, or otherwise than by the terms of the appended claims.

I claim:

1. The herein described method of joining flexible and rigid members, which comprises telescoping parts of said members, heating said parts to soften and render the same malleable and then simultaneously upsetting and shaping said softened parts.

2. The herein described method of joining a flexible cable to a rigid member, which comprises telescoping one end of said cable within an opening in said rigid member, heating said parts to soften and render the same malleable and then simultaneously upsetting and rotating said softened parts.

3. The herein described method of uniting a multi-stranded helically coiled flexible cable to a rigid fitting, which comprises telescoping one end of said cable within an opening in said fitting, clamping said telescoped parts to rigidly support them, heating said parts to a limp state and then upsetting the heated area to provide a ball and socket connection.

4. That method of uniting metal parts which comprises telescoping the parts and clamping the same to be rigidly supported, heating the telescoped parts and then subjecting the same to synchronized torsional and compressive stresses to twist and upset the same.

5. That method of bonding a flexible wire cable to a fitting, which comprises telescoping one end of the cable within the fitting, securing the outer end of the fitting, securing the inner end of the fitting and a portion of the cable adjacent thereto, passing an electric current through the telescoped parts from one secured point to the other to heat the telescoped parts, then moving one of the secured parts toward the other to upset the telescoped parts, and turning one of said secured parts.

6. That method of bonding a flexible wire cable to a fitting, which comprises telescoping one end of the cable within the fitting, securing the outer end of the fitting, securing the inner end of the fitting and a portion of the cable adjacent thereto, passing an electric current through the telescoped parts from one secured point to the other to heat the telescoped parts, and moving one of the secured points toward the other with a combined rotary and translatory motion to both twist and compress the parts.

ADOLPH ROSNER.